(12) United States Patent
Thangaswamy et al.

(10) Patent No.: US 9,291,126 B2
(45) Date of Patent: Mar. 22, 2016

(54) VALVE AND FILTER ASSEMBLY FOR A REGENERATION SYSTEM

(71) Applicant: Caterpillar, Inc., Peoria, IL (US)

(72) Inventors: Sridhar Thangaswamy, Peoria, IL (US); Eric Jon Blankenship, Washington, IL (US); Iulian G. Ghiorghias, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 718 days.

(21) Appl. No.: 13/652,869

(22) Filed: Oct. 16, 2012

(65) Prior Publication Data

US 2014/0102426 A1    Apr. 17, 2014

(51) Int. Cl.
*F01N 3/10*     (2006.01)
*F02M 25/07*    (2006.01)
*F01N 3/025*    (2006.01)
*F23K 5/18*     (2006.01)
*F23K 5/14*     (2006.01)

(52) U.S. Cl.
CPC ............... *F02M 25/07* (2013.01); *F01N 3/025* (2013.01); *F23K 5/147* (2013.01); *F23K 5/18* (2013.01); *F01N 2240/14* (2013.01); *Y02T 10/121* (2013.01); *Y10T 29/49231* (2015.01)

(58) Field of Classification Search
USPC ............................. 60/274, 286, 295, 301, 303
See application file for complete search history.

(56) References Cited

U.S. PATENT DOCUMENTS

| 4,813,233 | A | | 3/1989 | Vergeer et al. |
| 5,320,523 | A | * | 6/1994 | Stark .............................. 431/353 |
| 6,109,543 | A | * | 8/2000 | Bright et al. .................. 239/135 |
| 7,481,048 | B2 | | 1/2009 | Harmon et al. |
| 7,849,682 | B2 | * | 12/2010 | Miller et al. .................... 60/303 |
| 7,908,847 | B2 | | 3/2011 | Crawley et al. |
| 7,958,721 | B2 | | 6/2011 | Craig et al. |
| 8,056,324 | B2 | | 11/2011 | Wiley et al. |
| 8,056,326 | B2 | | 11/2011 | Cox et al. |
| 8,151,770 | B2 | | 4/2012 | Kawashima et al. |
| 8,429,903 | B2 | * | 4/2013 | Charles et al. .................. 60/295 |
| 8,484,947 | B2 | * | 7/2013 | Urven et al. .................... 60/286 |
| 8,959,902 | B2 | * | 2/2015 | Olivier et al. .................. 60/303 |
| 2011/0283685 | A1 | * | 11/2011 | Kotrba et al. .................. 60/286 |
| 2012/0067034 | A1 | | 3/2012 | McClure |

* cited by examiner

*Primary Examiner* — Binh Q Tran

(57) ABSTRACT

A regeneration system includes a housing defining an exhaust flow path. An inlet of the housing is configured to receive an exhaust flow from the internal combustion engine and an outlet of the housing is configured to direct the exhaust flow toward an exhaust aftertreatment component. A combustion head is coupled with the housing and configured to direct air and fuel to a combustion chamber in fluid communication with the exhaust flow path. A fuel supply passage is defined by the combustion head and is in fluid communication with the combustion chamber. The regeneration system also includes a valve and filter assembly disposed within the fuel supply passage. The valve and filter assembly includes an assembly housing defining a reduced fuel supply passage, a filter material coupled with the assembly housing, and a check valve at least partially disposed within the reduced fuel supply passage.

20 Claims, 4 Drawing Sheets

VALVE AND FILTER ASSEMBLY FOR A REGENERATION SYSTEM

TECHNICAL FIELD

The present disclosure relates generally to a regeneration system configured to regenerate an exhaust aftertreatment component of an internal combustion engine, and more particularly to a valve and filter assembly for use in a fuel supply passage of the regeneration system.

BACKGROUND

Toxic emissions produced by internal combustion engines are the subject of environmental concern and have prompted increasingly stringent emissions regulations by the government. Toxic emissions produced by diesel engines, for example, include hydrocarbons, nitrogen oxides, carbon monoxide, and particulate matter. To reduce these toxic emissions and comply with governmental regulations, a number of exhaust aftertreatment components, including particulate filters and catalytic converters, have been developed. Exhaust aftertreatment systems may also include a number of other devices, including exhaust gas recirculation components and devices for regenerating other of the aftertreatment components.

An exemplary regeneration system for regenerating a particulate filter may be positioned upstream from the particulate filter and may be configured to heat the exhaust stream and, thus, particulate matter to a temperature at which the accumulated particulate matter, or soot, combusts. In particular, the regeneration system may be configured to combust an air and fuel mixture within a combustion chamber in fluid communication with the exhaust flow and upstream from the particulate filter. According to the exemplary regeneration system, the air and fuel may be supplied through a combustion head of the regeneration system. Such a system is taught in U.S. Patent Application Publication No. 2012/0067034 to McClure. The McClure reference also teaches the use of a fuel injector for injecting fuel into the combustion chamber, and separate fuel filter and check valve components positioned in the fuel passage of the combustion head upstream from the fuel injector. After assembly of the regeneration system, testing, such as pressure testing, may be conducted. If a fault is indicated during the testing, it may be difficult, if not impossible, to replace faulty components and, as such, detected failures may necessitate replacement of the entire regeneration system or, at least, the combustion head.

The present disclosure is directed to one or more of the problems or issues set forth above.

SUMMARY OF THE DISCLOSURE

In one aspect, a regeneration system configured for use with an internal combustion engine includes a housing defining an exhaust flow path. An inlet of the housing is configured to receive an exhaust flow from the internal combustion engine and an outlet of the housing is configured to direct the exhaust flow toward an exhaust aftertreatment component. A combustion head is coupled with the housing and configured to direct air and fuel to a combustion chamber in fluid communication with the exhaust flow path. A fuel supply passage is defined by the combustion head and is in fluid communication with the combustion chamber. The regeneration system also includes a valve and filter assembly disposed within the fuel supply passage. The valve and filter assembly includes an assembly housing defining a reduced fuel supply passage, a filter material coupled with the assembly housing, and a check valve at least partially disposed within the reduced fuel supply passage.

In another aspect, a valve and filter assembly configured for use with the regeneration system includes an assembly housing having an external mounting surface and an internal surface defining a reduced fuel supply passage extending from an upstream housing end to a downstream housing end. A filter material is coupled with the assembly housing at the upstream housing end. A check valve is positioned in the reduced fuel supply passage and includes a valve member. The valve member has a biased closed position in which fuel flow through the reduced fuel supply passage is blocked and an open position defining a fuel flow path through the assembly housing. An O-ring is positioned about the assembly housing and, in an assembled configuration, defines a static seal joint between the valve and filter assembly and the combustion head.

In yet another aspect, a method of assembling the regeneration system includes steps of installing a valve and filter assembly in the fuel supply passage, and identifying a regeneration system fault indicating a check valve failure. The filter medium and the check valve are simultaneously removed from the fuel supply passage by removing the valve and filter assembly from the fuel supply passage. The method also includes installing a replacement valve and filter assembly in the fuel supply passage.

DETAILED DESCRIPTION

Figure 1:
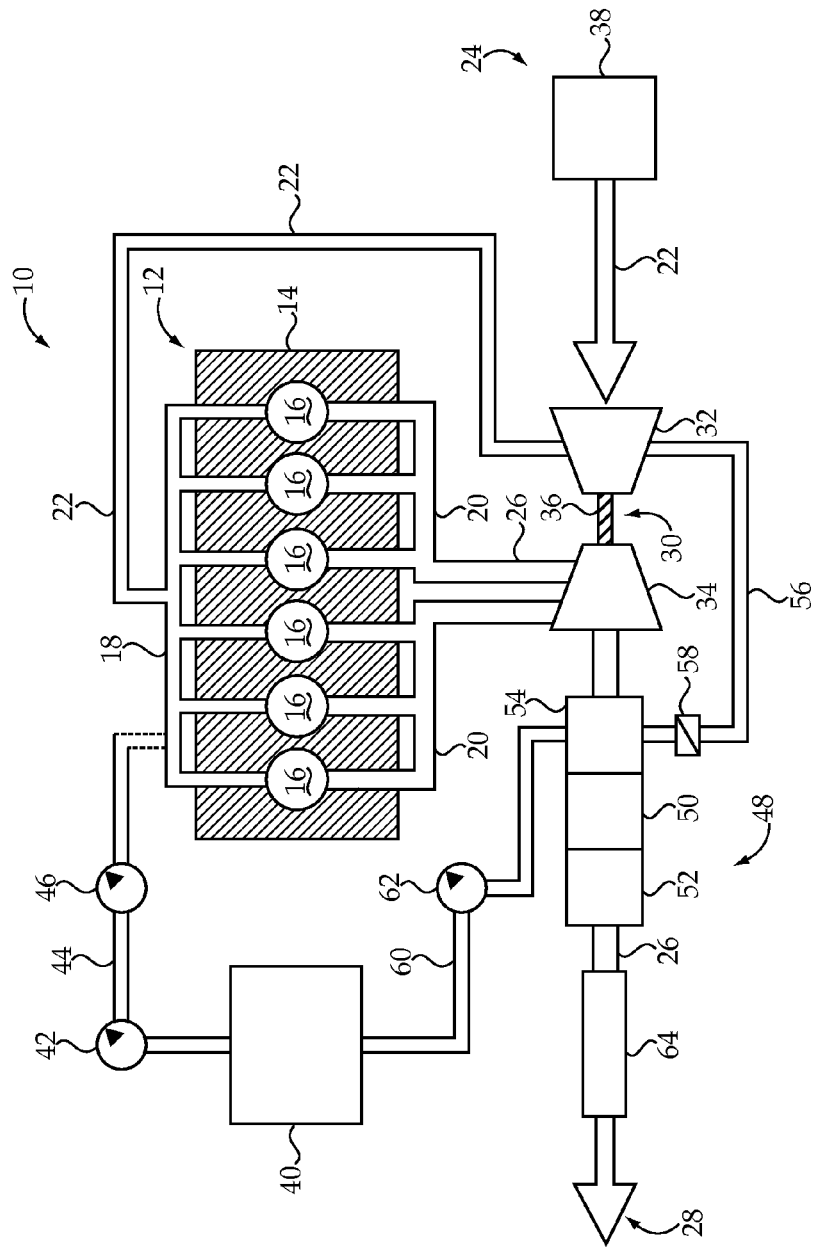
FIG. 1 is a schematic of an engine system including a regeneration system, according to the present disclosure.

Referring to FIG. 1, there is shown a schematic view of an engine system 10, according to the present disclosure. The engine system 10 includes an internal combustion engine 12, which, for purposes of illustration, and not limitation, is that of a four-stroke, compression ignition engine and includes an engine block 14 defining a plurality of combustion chambers or cylinders 16. The internal combustion engine 12 may be any type of engine (e.g., internal combustion, gas, diesel, gaseous fuel, natural gas, propane, etc.), may be of any size, with any number of cylinders, any type of combustion chamber (e.g., cylindrical, rotary spark ignition, compression ignition, 4-stroke and 2-stroke, etc.), and in any configuration (e.g., "V," in-line, radial, etc.). In the exemplary internal combustion engine 12, six combustion chambers 16 are shown, however, those skilled in the art will appreciate that any number of combustion chambers may be applicable. The internal combustion engine 12 also includes an intake manifold 18 in communication with the combustion chambers 16 and capable of providing air to the internal combustion engine 12, and an exhaust manifold 20 also in communication with the combustion chambers 16 and capable of expending exhaust gas from the engine block 14.

Generally speaking, the engine system 10 includes an intake air conduit 22, or passageway, extending from an air inlet 24 to the intake manifold 18, and an exhaust conduit 26, or passageway, extending from the exhaust manifold 20 to an exhaust outlet 28. The engine system 10 may also include a turbocharger of standard design, shown generally at 30. Although one turbocharger is shown in the illustrated embodiment, it is known that more than one turbocharger, positioned in series or parallel, may be used in the engine system 10. The turbocharger 30 includes a compressor 32, disposed along the intake air conduit 22, connected to a turbine 34, disposed along the exhaust conduit 26, via a shaft 36. Exhaust gas leaving the exhaust manifold 20 passes through the exhaust conduit 26 and to a wheel of the turbine 34 to make it rotate. The rotation of the wheel turns the shaft 36, which, in turn, rotates a wheel of the compressor 32. The rotation of the compressor wheel pulls in ambient air through the intake air conduit 22 and compresses it. As should be appreciated, the ambient air may be filtered using one or more air filters 38.

The engine system 10 may also include a fuel tank 40 for storing a fuel, such as, for example, diesel fuel. A fuel transfer pump 42 may be positioned along a fuel supply line 44 for drawing low pressure fuel from the fuel tank 40. The low pressure fuel may be further pressurized by a high pressure fuel pump 46 and circulated to a plurality of fuel injectors configured for injecting fuel into respective cylinders 16. Although not within the scope of the present disclosure, one or more fuel filters may be positioned along the fuel supply line 44 for filtering particulates and other contaminants from the fuel. As should be appreciated, the engine system 10 or, more particularly the fuel supply line 44 may include additional components and systems, including, but not limited to additional pumps and pressure regulators.

The engine system 10 also includes an exhaust aftertreatment system 48 disposed along the exhaust conduit 26. According to the exemplary embodiment, the engine system 10 may include a plurality of aftertreatment components, which may be packaged together or separately, to define the exhaust aftertreatment system 48. For example, the aftertreatment system 48 may include a catalyst-based device 50. The catalyst-based device 50 may include a catalyst configured to convert, such as via oxidation or reduction, one or more gaseous constituents of the exhaust gas produced by the internal combustion engine 12 to a more environmentally friendly gas and/or compound to be discharged into the atmosphere. For example, the catalyst may be configured to chemically alter at least one component of the exhaust flow. Catalyst-based device 50 may be configured for one or more various types of conversion, such as, for example, selective catalytic reduction (SCR), diesel oxidation (e.g., a diesel oxidation catalyst, DOC), and/or adsorption of nitrous oxides ($NO_x$; e.g., a $NO_x$ adsorber).

The aftertreatment system 48 may also include a particulate trap, such as, for example, a diesel particulate filter (DPF) 52. The DPF 52 may include any type of aftertreatment device configured to remove one or more types of particulate matter, such as soot and/or ash, from an exhaust flow of the internal combustion engine 12. The DPF 52 may include a filter medium configured to trap the particulate matter as the exhaust gas flows through it. The filter medium may consist of a mesh-like material, a porous ceramic material (e.g., cordierite), or any other material and/or configuration suitable for trapping particulate matter. Regenerating means, such as well known active and/or passive regeneration means, may also be provided to periodically or continuously oxidize trapped particulate matter in the DPF 52. A regeneration system, which may also be generally referred to as an aftertreatment component, is shown generally at 54.

According to the exemplary embodiment, the regeneration system 54, which may be an active regeneration system, may be configured to heat the exhaust flow passing through exhaust conduit 26 by combusting an air and fuel mixture within a combustion chamber (not shown) in fluid communication with the exhaust flow and upstream from the DPF 52. Air may be supplied to the regeneration system 54 from the compressor 32 of the turbocharger 30 along an air supply conduit 56. A valve 58 may be positioned along the air supply conduit 56 for selectively supplying required amounts of compressed intake air. In addition, fuel may be supplied to the regeneration system 54 along a fuel supply conduit 60. A pump 62 may be fluidly positioned along the fuel supply conduit 60 from drawing fuel from the fuel tank 40 and supplying pressurized fuel to the regeneration system 54. According to some embodiments, the pump 62 may be engine driven or may be electrically driven and may supply low or medium pressure fuel, such as diesel fuel, to the regeneration system 54.

According to the exemplary embodiment, the engine system 10 may also include a muffler 64 for reducing the amount of noise emitted by the exhaust of the internal combustion engine 12. The muffler 64, as referenced herein, may also be referred to generally as an aftertreatment component. It should be appreciated that the engine system 10 may include any number and/or combination of aftertreatment components for treating or otherwise affecting the exhaust, and, further, any one or more aftertreatment components may be packaged together within a common module. Although the aftertreatment components (e.g., 50, 52, 54, and 64) are shown positioned downstream from the turbine 34 of the turbocharger 30, it should be appreciated that one or more aftertreatment components may be positioned upstream from the turbine 34.

Over time, the particulate matter may build up in the DPF 52. If the accumulated particulate matter, or soot, reaches a certain level, the particulate matter buildup could restrict or block the flow of exhaust through the DPF 52, allowing the backpressure in the engine system 10 to increase. As such, it may be desirable to regenerate the DPF 52 at predetermined intervals or when an undesirable amount of particulate matter buildup is detected. For example, one or more pressure sensors may be disposed along the exhaust conduit 26 to identify a pressure drop across the DPF 52. When regeneration is needed or desired, the regeneration system 54 may initiate an active regeneration of the DPF 52.

Figure 2:
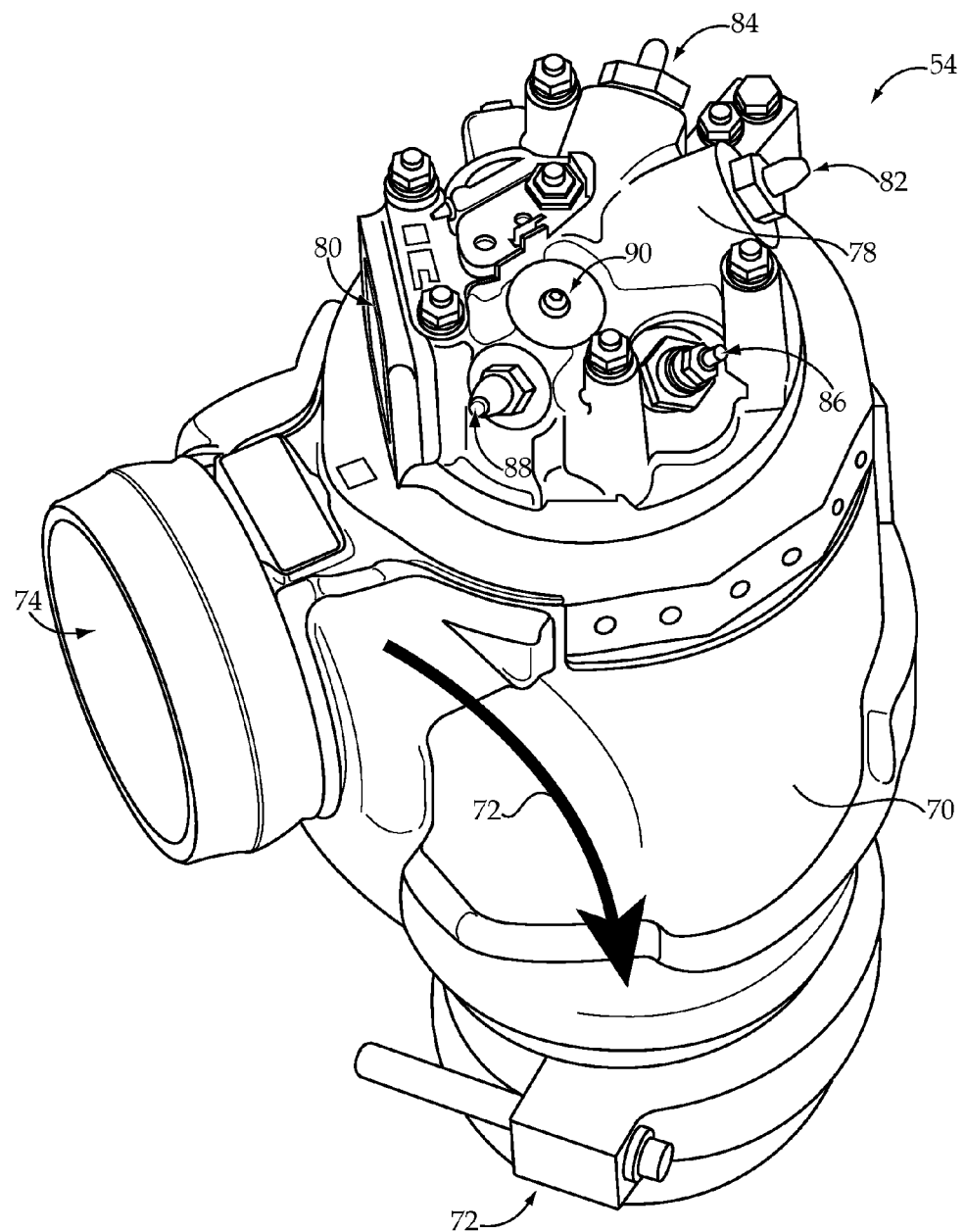
FIG. 2 is a perspective view of an exemplary embodiment of the regeneration system of FIG. 1.

Turning now to FIG. 2, the regeneration system 54, which is configured for use with the internal combustion engine 12, may generally include a housing 70 defining an exhaust flow path 72 and having an inlet 74 configured to receive an exhaust flow from the internal combustion engine 12 and an outlet 76 configured to direct the exhaust flow toward an exhaust aftertreatment component within the exhaust aftertreatment system 48, such as the DPF 52. A combustion head 78 is coupled with the housing 70 and configured to direct air and fuel to a combustion chamber, discussed below with reference to FIG. 3, in fluid communication with the exhaust flow path 72. The combustion head 78 includes an air inlet 80, which may be in fluid communication with the air supply conduit 56 to receive air from the compressor 32. The combustion head 78 also includes one or more fuel inlets, such as fuel inlets 82 and 84, which may be configured to receive fuel from the fuel tank 40 along one or more fuel supply conduits

60. Known interfaces and connections may be used to fluidly connect the regeneration system 54 with the respective fluid sources.

The combustion head 78 may also include a spark plug 86, or other ignition means, for facilitating ignition of fuel and air injected into the combustion chamber. To further assist in achieving ignition of the fuel and air mixture, a heater may be supported on the housing 70 and positioned to elevate a temperature of the fuel supplied to the combustion chamber. An electronic controller, which may be an electronic controller for controlling operation of the engine system 10, may be in control communication with the spark plug 86, the heater, and other components, including control valves and sensors. For example, when air and fuel are being supplied to the housing 70, the electronic controller may controllably activate heater, and also controllably activate spark plug. According to a specific example, the spark plug 86 may be periodically activated to initiate or assist in initiating combustion of the fuel and air passing to the combustion chamber.

A cooling system may also be provided for the combustion head 78. Although not shown, the cooling system may include a pump supplying a coolant fluid, such as engine coolant, to an inlet 88 coupled with the housing 70. The coolant fluid may be passed from the inlet 88, through a coolant passage of the combustion head 78, and may exit through an outlet 90. The coolant may be passed through a heat exchanger before returning to the pump and being circulated again along the coolant circuit. As should be appreciated, the combustion head 78, and regeneration system 54 in general, may include additional and/or alternative components to facilitate an active regeneration in a manner described herein.

Figure 3:
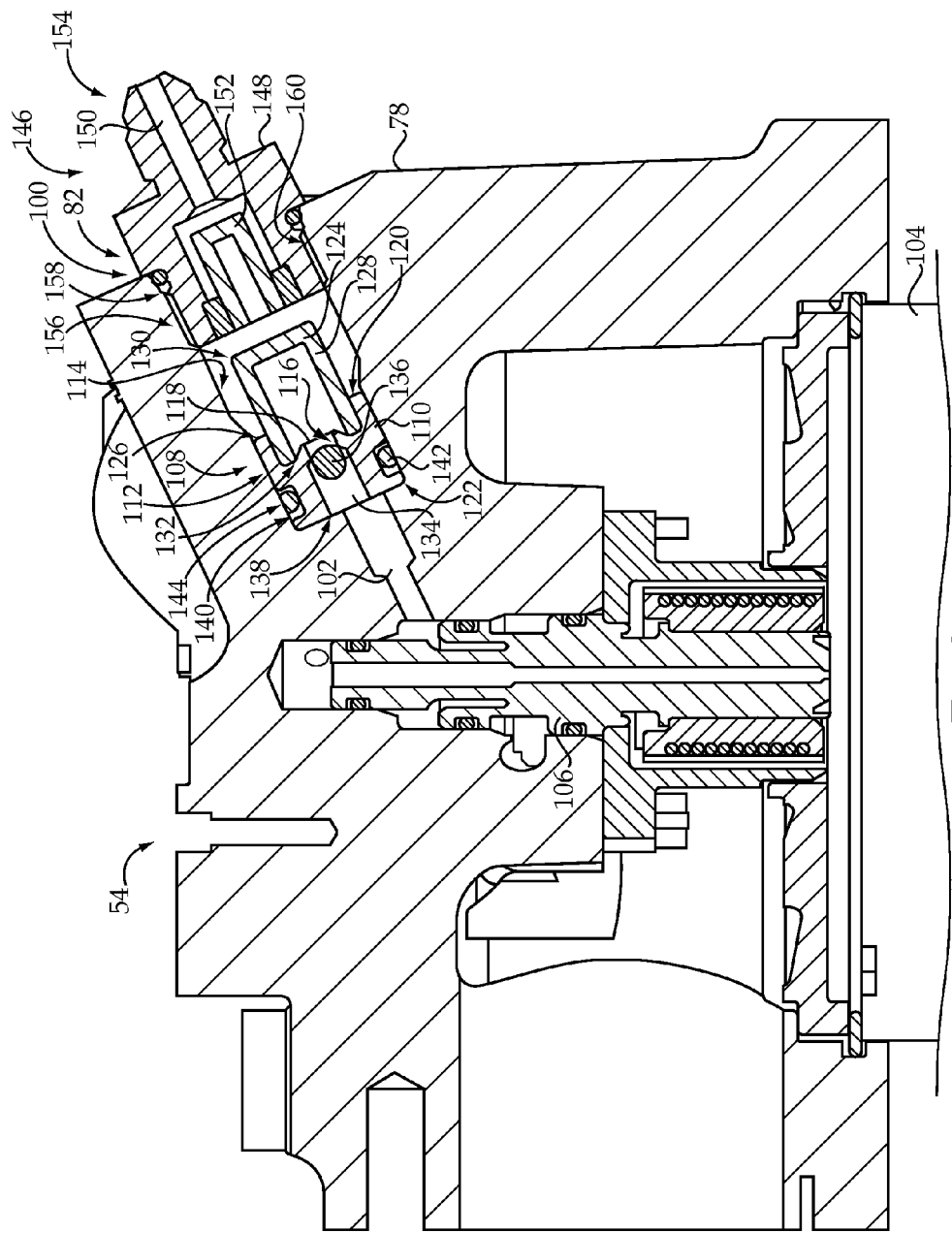
FIG. 3 is a sectioned view of the regeneration system of FIG. 2, depicting a valve and filter assembly positioned along a main fuel circuit, according to one aspect of the present disclosure.

Turning now to FIG. 3, a sectioned view through the combustion head 78 is shown, depicting the fuel inlet 82, which may define a portion of a main fuel circuit 100 of the regeneration system 54. For example, the combustion head 78 may define a main fuel supply passage 102 in fluid communication with a combustion chamber 104. A fuel injector 106 may be disposed along the main fuel circuit 100, or main fuel supply passage 102, for injecting a precise amount of fuel supplied by the fuel tank 40 to the combustion chamber 104.

A valve and filter assembly 108, according to the present disclosure, may be disposed within the fuel supply passage 102 upstream from the fuel injector 106. The valve and filter assembly 108 may generally include an assembly housing 110, such as a substantially cylindrical housing, having an external mounting surface 112 for engaging an internal surface 114 of the main fuel supply passage 102. The assembly housing 110 also has an internal surface 116 defining a reduced fuel supply passage 118 extending from an upstream housing end 120 to a downstream housing end 122. As shown, the assembly housing 110 may have a stepped profile, with a diameter of the reduced fuel supply passage 118 being larger at the upstream housing end 120 than at the downstream housing end 122.

The valve and filter assembly 108 includes a filter material 124 coupled with the assembly housing 110 at the upstream housing end 120. The filter material 124 may be adhered to the assembly housing 110 at an adhered joint 126 such that the filter material 124 is partially disposed within the reduced fuel supply passage 118 and projects outwardly from the upstream housing end 120. According to a specific example, the filter material 124 may include a three-dimensional wetted filter surface and may have a cup-shaped body 128 having a closed upstream end 130 and an open downstream end 132. Although a particular filter material is described, it should be appreciated that any filter medium may be coupled to the assembly housing 110 using any known attachment means, as contemplated by the present disclosure.

The valve and filter assembly 108 also includes a check valve 134, such as a micro check valve, positioned in the reduced fuel supply passage 118 and including a valve member 136. The valve member 136 has a biased closed position in which fuel flow through the reduced fuel supply passage 118 is blocked and an open position defining a fuel flow path through the assembly housing 110. The check valve 134 may be retained within the reduced fuel supply passage 118 using a press-fit joint 138. Based on the specific configuration, a reverse flow check valve may be used. For example, the check valve 134 may be inserted into the reduced fuel supply passage 118 from the downstream housing end 122 toward the upstream housing end 120, but may be configured to block fuel flowing through the assembly housing 110 from the upstream housing end 120 toward the downstream housing end 122 unless a predetermined fuel pressure threshold is exceeded.

The assembly housing 110 may further include an annular groove 140 formed within the external mounting surface 112 for at least partially receiving an O-ring 142, or other similar sealing member. The O-ring 142 may be positioned about the assembly housing 110 and, in an assembled configuration, may define a static seal joint 144 between the valve and filter assembly 108 and the combustion head 78. In particular, expansion of the O-ring 142 may restrict axial movement of the valve and filter assembly 108 within the fuel supply passage 102. Alternative connection means that facilitate a reversible installation, as described below, are also contemplated According to the exemplary embodiment, the valve and filter assembly 108 may be a secondary filtration mechanism, and the regeneration system 54 may also include a primary filtration mechanism 146 disposed at least partially within the fuel supply passage 102 upstream from the secondary filtration mechanism 108. The primary filtration mechanism 146 may include a primary housing 148 defining an additional reduced fuel supply passage 150, and a primary filter material 152, similar to filter material 124, coupled with the primary housing 148. The primary housing 148 may include a fuel line engagement end 154 and a combustion head engagement end 156. The combustion head engagement end 156 may include an external thread 158 engaged with an internal thread 160 of the fuel supply passage 102.

The primary filtration mechanism 146 may be a serviceable filter mechanism, while the secondary filtration mechanism 108 may be a non-serviceable filter mechanism. In particular, during servicing of the regeneration system 54, the primary filtration mechanism 146 may be replaced, if necessary or desired, by disengaging the external thread 158 of the combustion head engagement end 156 from the internal thread 160 of the fuel supply passage 102. During the replacement of the primary filtration mechanism 146, additional contaminants may be introduced into the fuel supply passage 102. As such, the secondary filtration mechanism 108, which is not typically replaced during servicing, may filter the contaminants and reduce risk of damage to downstream components, such as the fuel injector 106.

Figure 4:
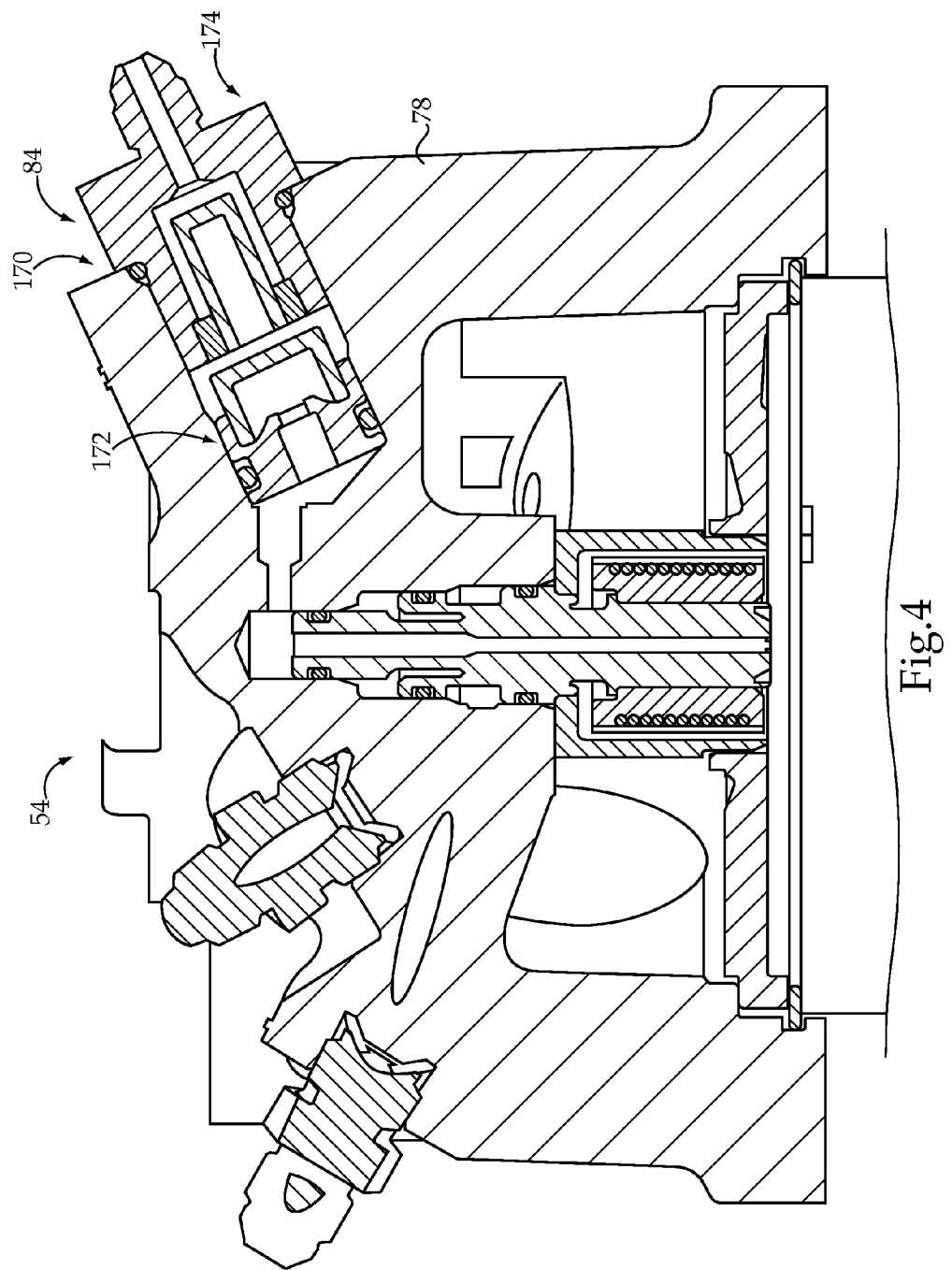
FIG. 4 is a sectioned view of the regeneration system of FIG. 2, depicting an additional valve and filter assembly positioned along a pilot fuel circuit, according to another aspect of the present disclosure.

The combustion head 78 may also define a pilot fuel circuit 170 for providing fuel to the fuel injector 106, with an additional valve and filter assembly 172 disposed along the pilot fuel circuit 170, as shown in FIG. 4. The additional valve and filter assembly 172 may be similar to the valve and filter assembly 108 described above. In addition, the additional valve and filter assembly 172 may be a secondary filtration mechanism, with the pilot fuel circuit 170 also including a primary filtration mechanism 174, similar to the one described above. Although similar to the valve and filter assembly 108 described above, it should be appreciated that the additional valve and filter assembly 172 may be modified based on specific requirements of the pilot fuel circuit 170.

INDUSTRIAL APPLICABILITY

The present disclosure may be applicable to engine systems having an exhaust aftertreatment system. Further, the present disclosure may be applicable to engine systems having a regeneration system for actively regenerating a particulate filter of the exhaust aftertreatment system. Yet further, the present disclosure may be particularly applicable to regeneration systems including valve and filter components positioned within passages defined by a combustion head of the regeneration system.

Referring generally to FIGS. 1-4, an engine system 10 may include an internal combustion engine 12 having an engine block 14 defining a plurality of combustion chambers or cylinders 16. An intake system may generally include an intake air conduit 22 extending from an air inlet 24 to an intake manifold 18, with an air filter 38 and compressor 32 of a turbocharger 30 disposed along the conduit 22. One or more pumps 42 and 46 may be positioned along a fuel supply line 44 for delivering high pressure fuel from a fuel tank 40 to a plurality of fuel injectors configured for injecting fuel into respective cylinders 16. The engine system 10 may be configured to route exhaust gases produced by the internal combustion engine 12 away from the engine 12 via the exhaust conduit 26, which may be configured to direct the exhaust flow from the internal combustion engine 12 through the turbine 34 of the turbocharger 30, through aftertreatment system 48, and ultimately release the exhaust flow to the atmosphere through the exhaust outlet 28.

The aftertreatment system 48 may, for example, include a catalyst-based device 50, a diesel particulate filter (DPF) 52, muffler 64, and a regeneration system 54 configured to heat the exhaust flow passing through exhaust conduit 26 by combusting an air and fuel mixture within a combustion chamber 104 in fluid communication with the exhaust flow and upstream from the DPF 52. In particular, the aftertreatment system 48 may generally include a housing 70 defining an exhaust flow path 72 and having an inlet 74 configured to receive an exhaust flow from the internal combustion engine 12 and an outlet 76 configured to direct the exhaust flow toward an exhaust aftertreatment component, such as the DPF 52. A combustion head 78 is coupled with the housing 70 and configured to direct air and fuel into the combustion chamber 104, which is in fluid communication with the exhaust flow path 72. In particular, the combustion head 78 includes an air inlet 80, which may be in fluid communication with an air supply conduit 56 to receive air from the compressor 32. The combustion head 78 also includes one or more fuel inlets, such as fuel inlets 82 and 84, which may be configured to receive fuel from the fuel tank 40 along one or more fuel supply conduits 60. Ultimately, according to the exemplary embodiment, fuel may be supplied to a fuel injector 106 of the regeneration system 54 along a main fuel circuit 100 including fuel inlet 82 and a pilot fuel circuit 170 including fuel inlet 84.

During assembly of the regeneration system 54, at least one valve and filter assembly, such as valve and filter assembly 108 or valve and filter assembly 172, may be provided for installation along one or both of the main fuel circuit 100 and the pilot fuel circuit 170. To assemble the valve and filter assembly 108, a filter material 124 may be disposed partially within a reduced fuel supply passage 118 of an assembly housing 110 such that the filter material 124 projects outwardly from an upstream housing end 120 of the assembly housing 110. For example, the filter material 124 may be adhered within the reduced fuel supply passage 118. In addition, a check valve 134, such as a reverse flow micro check valve, may be press-fit within the reduced fuel supply passage 118 from a downstream housing end 122 of the assembly housing 110. An O-ring 142 may be supported within an annular groove 140 formed within an external mounting surface 112 of the assembly housing 110. Next, the valve and filter assembly 108 may be installed in a fuel supply passage 102 defined by the combustion head 78. The valve and filter assembly 108 may be retained within the fuel supply passage 102 by forming a static seal joint 144 between the valve and filter assembly 108 and the combustion head 78 with the O-ring 142.

After assembly, the regeneration system 54 may undergo testing, including pressure testing. If a regeneration system fault is identified indicating a possible check valve failure, the filter material 124 and the check valve 134 may be removed simultaneously from the fuel supply passage 102 by removing the valve and filter assembly 108 from the fuel supply passage 102. For example, a work tool may grip the external surface of the filter material 124 at a closed upstream end 130 to remove the filter assembly housing 110, and supported components, from the fuel supply passage 102. A replacement valve and filter assembly, similar to valve and filter assembly 108 or 172, may then be installed in the fuel supply passage 102.

Utilizing a valve and filter assembly, as disclosed herein, provides improved manufacturing by reducing waste. With particular reference to a regeneration system, if a check valve failure is detected during assembly, a conventional press-fit check valve would necessitate replacement of the entire combustion head. However, utilizing the valve and filter assembly having the reversible installation described herein permits the removal and replacement of the check valve, as an integral part of the valve and filter assembly, without having to scrap all or portions of the regeneration system. Although the valve and filter assembly is described in the context of a regeneration system, it should be appreciated that the valve and filter assembly is applicable to a wide variety of fluid passages.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A regeneration system configured for use with an internal combustion engine, comprising:
    a housing defining an exhaust flow path and having an inlet configured to receive an exhaust flow from the internal combustion engine and an outlet configured to direct the exhaust flow toward an exhaust aftertreatment component;
    a combustion head coupled with the housing and configured to direct air and fuel to a combustion chamber in fluid communication with the exhaust flow path;
    a fuel supply passage defined within the combustion head and in fluid communication with the combustion chamber; and
    a valve and filter assembly disposed within the fuel supply passage, wherein the valve and filter assembly includes an assembly housing defining a reduced fuel supply passage, a filter material coupled with the assembly housing, and a check valve at least partially disposed within the reduced fuel supply passage.

2. The regeneration system of claim 1, further including an O-ring positioned about the assembly housing and defining a static seal joint between the valve and filter assembly and the combustion head.

3. The regeneration system of claim 2, wherein the valve and filter assembly is a secondary filtration mechanism and the regeneration system further includes a primary filtration mechanism disposed at least partially within the fuel supply passage upstream from the secondary filtration mechanism.

4. The regeneration system of claim 3, wherein the primary filtration mechanism includes a primary housing defining an additional reduced fuel supply passage, and a primary filter material coupled with the primary housing.

5. The regeneration system of claim 4, wherein the primary housing includes a fuel line engagement end and a combustion head engagement end, wherein the combustion head engagement end includes an external thread engaged with an internal thread of the fuel supply passage.

6. The regeneration system of claim 1, wherein the fuel supply passage defines a main fuel circuit and the regeneration system further includes another fuel supply passage defining a pilot fuel circuit, wherein an additional valve and filter assembly is disposed along the pilot fuel circuit.

7. The regeneration system of claim 1, wherein the filter material includes a three-dimensional wetted filter surface.

8. A valve and filter assembly configured for use with a regeneration system, wherein the regeneration system includes: a housing defining an exhaust flow path and having an inlet configured to receive an exhaust flow from an internal combustion engine and an outlet configured to direct the exhaust flow toward an exhaust aftertreatment component; a combustion head coupled with the housing and configured to direct air and fuel to a combustion chamber in fluid communication with the exhaust flow path; and a fuel supply passage defined within the combustion head and in fluid communication with the combustion chamber, the valve and filter assembly comprising:
   an assembly housing disposed within the fuel supply passage, the assembly housing having an external mounting surface and an internal surface defining a reduced fuel supply passage extending from an upstream housing end to a downstream housing end;
   a filter material coupled with the assembly housing at the upstream housing end;
   a check valve positioned in the reduced fuel supply passage and including a valve member, wherein the valve member has a biased closed position wherein fuel flow through the reduced fuel supply passage is blocked and an open position defining a fuel flow path through the assembly housing; and
   an O-ring positioned about the assembly housing, wherein, in an assembled configuration, the O-ring defines a static seal joint between the valve and filter assembly and the combustion head.

9. The valve and filter assembly of claim 8, wherein the check valve is retained within the reduced fuel supply passage using a press-fit joint.

10. The valve and filter assembly of claim 9, wherein a diameter of the fuel supply passage is larger at the upstream housing end than at the downstream housing end.

11. The valve and filter assembly of claim 10, wherein the filter material is partially disposed within the reduced fuel supply passage and projects outwardly from the upstream housing end.

12. The valve and filter assembly of claim 11, wherein the filter material is coupled with the assembly housing at an adhered joint.

13. The valve and filter assembly of claim 12, wherein the filter material includes a three-dimensional wetted filter surface.

14. The valve and filter assembly of claim 8, further including an annular groove formed within the external mounting surface for at least partially receiving the O-ring.

15. The valve and filter assembly of claim 8, wherein the check valve is a reverse flow check valve.

16. A method of assembling a regeneration system configured for use with an internal combustion engine, wherein the regeneration system includes: a housing defining an exhaust flow path and having an inlet configured to receive an exhaust flow from an internal combustion engine and an outlet configured to direct the exhaust flow toward an exhaust aftertreatment component; a combustion head coupled with the housing and configured to direct air and fuel to a combustion chamber in fluid communication with the exhaust flow path; and a fuel supply passage defined within the combustion head and in fluid communication with the combustion chamber, the method comprising steps of:
   installing a valve and filter assembly in the fuel supply passage, wherein the valve and filter assembly includes an assembly housing defining a reduced fuel supply passage, a filter material coupled with the assembly housing, and a check valve at least partially disposed within the reduced fuel supply passage;
   identifying a regeneration system fault indicating a check valve failure;
   removing the filter material and the check valve simultaneously from the fuel supply passage by removing the valve and filter assembly from the fuel supply passage; and
   installing a replacement valve and filter assembly in the fuel supply passage.

17. The method of claim 16, further including press fitting the check valve within the reduced fuel supply passage of the assembly housing prior to the step of installing the valve and filter assembly in the fuel supply passage.

18. The method of claim 16, further including disposing the filter material partially within the reduced fuel supply passage such that the filter material projects outwardly from an upstream filter end of the assembly housing prior to the step of installing the valve and filter assembly in the fuel supply passage.

19. The method of claim 16, further including supporting an O-ring within an annular groove formed within an external mounting surface of the assembly housing prior to the step of installing the valve and filter assembly in the fuel supply passage.

20. The method of claim 19, further including retaining the valve and filter assembly within the fuel supply passage by forming a static seal joint between the valve and filter assembly and the combustion head with the O-ring.

* * * * *